us009616762B2

(12) United States Patent
Yamamoto (10) Patent No.: US 9,616,762 B2
(45) Date of Patent: Apr. 11, 2017

(54) VEHICLE POWER SUPPLY DEVICE (71) Applicant: NISSAN MOTOR CO., LTD., Yokohama-shi, Kanagawa (JP)

(72) Inventor: Naoki Yamamoto, Hachioji (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/782,157

(22) PCT Filed: Mar. 20, 2014

(86) PCT No.: PCT/JP2014/057674
§ 371 (c)(1),
(2) Date: Oct. 2, 2015

(87) PCT Pub. No.: WO2014/162885
PCT Pub. Date: Oct. 9, 2014

(65) Prior Publication Data
US 2016/0046202 A1 Feb. 18, 2016

(30) Foreign Application Priority Data

Apr. 5, 2013 (JP) .................. 2013-079326

(51) Int. Cl.
B60L 11/18 (2006.01)
B60L 1/14 (2006.01)
B60L 11/02 (2006.01)

(52) U.S. Cl.
CPC ............. B60L 11/1859 (2013.01); B60L 1/14 (2013.01); B60L 11/02 (2013.01);
(Continued)

(58) Field of Classification Search
CPC .... B60L 11/1859; B60L 11/02; B60L 11/1803
(Continued)

(56) References Cited

U.S. PATENT DOCUMENTS

2011/0109158 A1* 5/2011 Olsen .................... B60L 3/0069
307/10.1
2012/0068537 A1* 3/2012 Hintz .................... B60L 11/005
307/43
(Continued)

FOREIGN PATENT DOCUMENTS

EP 2032396 A2 3/2009
EP 2215351 A2 8/2010
(Continued)

Primary Examiner — Thienvu Tran
Assistant Examiner — David M Stables
(74) Attorney, Agent, or Firm — Young Basile Hanlon & MacFarlane, P.C.

(57) ABSTRACT

A vehicle power supply device includes: a plug socket to supply an external device with electrical power; and an external output switch configured to be switched between an on state in which the electrical power is supplied from a battery to the plug socket and an off state in which the supply of the electrical power is stopped. In a case where the external output switch is in the on state, when the vehicle transitions from a ready mode to an OFF mode, the switch control unit sets the external output switch to the off state along with the transition, and when the vehicle transitions from an ACC mode or an ON mode to the OFF mode, the switch control unit maintains the on state of the external output switch.

6 Claims, 5 Drawing Sheets (52) U.S. Cl.
CPC ......... *B60L 11/1803* (2013.01); *B60L 11/185* (2013.01); *B60L 11/1816* (2013.01); *B60L 11/1824* (2013.01); *B60L 11/1846* (2013.01); *B60L 11/1861* (2013.01); *B60L 11/1864* (2013.01); *B60L 11/1868* (2013.01); *B60L 2210/10* (2013.01); *B60L 2250/10* (2013.01); *B60L 2250/16* (2013.01); *Y02T 10/7005* (2013.01); *Y02T 10/7044* (2013.01); *Y02T 10/7061* (2013.01); *Y02T 10/7066* (2013.01); *Y02T 10/7072* (2013.01); *Y02T 10/7216* (2013.01); *Y02T 90/121* (2013.01); *Y02T 90/127* (2013.01); *Y02T 90/128* (2013.01); *Y02T 90/14* (2013.01); *Y02T 90/169* (2013.01); *Y04S 30/14* (2013.01)

(58) Field of Classification Search
USPC .. 307/9.1, 10.1, 10.2, 10.3, 10.4, 10.5, 10.6, 307/10.7, 10.8
See application file for complete search history.

(56) References Cited

U.S. PATENT DOCUMENTS

| | | | | |
|---|---|---|---|---|
| 2014/0225433 A1* | 8/2014 | Niizuma | ............... | B60L 7/14 307/10.1 |
| 2014/0232180 A1* | 8/2014 | Kinomura | ............... | B60L 11/12 307/9.1 |
| 2014/0303821 A1* | 10/2014 | Oda | ............... | B60L 1/006 701/22 |
| 2015/0210179 A1* | 7/2015 | Teraya | ............... | B60K 6/445 307/10.1 |
| 2015/0291039 A1* | 10/2015 | Sakata | ............... | H01M 10/441 307/10.1 |
| 2015/0298556 A1* | 10/2015 | Sakata | ............... | B60R 16/033 307/10.1 |
| 2015/0298688 A1* | 10/2015 | Teraya | ............... | B60K 6/445 701/22 |
| 2016/0072282 A1* | 3/2016 | Kumagai | ............... | H02J 7/0014 307/10.1 |

FOREIGN PATENT DOCUMENTS

| | | | | |
|---|---|---|---|---|
| JP | 2004-098921 A | 4/2004 | | |
| JP | 2004-276672 A | 10/2004 | | |
| JP | 2007015501 A | 1/2007 | | |
| JP | 2007-314086 A | 12/2007 | | |
| JP | 2008-059214 A | 3/2008 | | |
| JP | WO 2013061122 A2 * | 5/2013 | ............ | B60L 1/006 |
| KR | 10-1998-0073711 A | 11/1998 | | |
| KR | 10-1999-0018560 A | 3/1999 | | |
| WO | 2009053837 A2 | 4/2009 | | |

* cited by examiner

OUTPUT STOPPED

FIG. 3B

OUTPUT ALLOWED

VEHICLE POWER SUPPLY DEVICE

CROSS REFERENCE TO RELATED APPLICATION

The present application is based on Japanese Patent Application No. 2013-079326 filed on Apr. 5, 2013, the entire content of which is herein incorporated by reference.

TECHNICAL FIELD

The present invention relates to a vehicle power supply device and particularly relates to a technique of preventing electrical power stored in the battery from being consumed more than necessary.

BACKGROUND

A vehicle power supply device as follows has been conventionally proposed. A high-voltage battery is mounted in a vehicle and DC electrical power outputted from the battery is converted to AC electrical power by an inverter to supply electrical power to a plug socket (external output terminal) (see, for example, Japanese Patent Application Publication No. 2004-276672). Mounting the power supply device in the vehicle enables an operation of an electric device in the vehicle. Accordingly, for example, a mobile phone can be charged in the vehicle by connecting a charger of the mobile phone to the power supply device.

In such a power supply device, a power supply switch of the vehicle and an external output switch for turning on and off the output of electrical power stored in the battery are independently provided. Accordingly, even when the vehicle is stopped and the power supply switch is in an off state (OFF mode), the electrical power can be supplied from the battery as long as the external output switch is in an on state, and the power supply device has excellent usability.

However, when the external output switch is in the on state, the inverter for converting the DC electrical power to the AC electrical power is in an operational state. Accordingly, when this state continues for a long time, the electrical power stored in the battery is gradually consumed and eventually used up. Furthermore, the power supply device has a problem that, when a driver gets off the vehicle forgetting that the electric device is connected to the plug socket, the electrical power stored in the battery is unintentionally consumed and is eventually used up.

As described above, in the conventional vehicle power supply device, the power supply switch and the external output switch are independently provided. This causes a problem that, when a long time elapses with the external output switch being in the on state, the electrical power stored in the battery is unnecessarily consumed and eventually used up.

SUMMARY

The present invention has been made to solve such conventional problems, and an object of the present invention is to provide a vehicle power supply device capable of preventing the electrical power stored in the battery from being consumed while a vehicle is stopped.

In order to achieve the object described above, in a vehicle power supply device according to one aspect of the present invention, when a vehicle transitions from a drive-force-generatable on mode to an off mode, an external output switch is switched to an off state along with this transition. Moreover, when the vehicle transitions from a no-drive-force-generating on mode to the off mode, an on state of the external output switch is maintained.

DETAILED DESCRIPTION OF THE EMBODIMENTS

Embodiments of the present invention are described below based on the drawings.

[Description of First Embodiment]

Configurations of a vehicle system 100 including a vehicle power supply device in a first embodiment of the present invention and peripheral devices of the vehicle system 100 are described with reference to FIG. 1. The vehicle system 100 can be mounted in a vehicle such as an electric car, a hybrid car, and a plug-in hybrid car which can travel by using a motor as a drive source. In the embodiment, description is given of an example in which the vehicle system 100 is mounted in an electric car.

Figure 1:
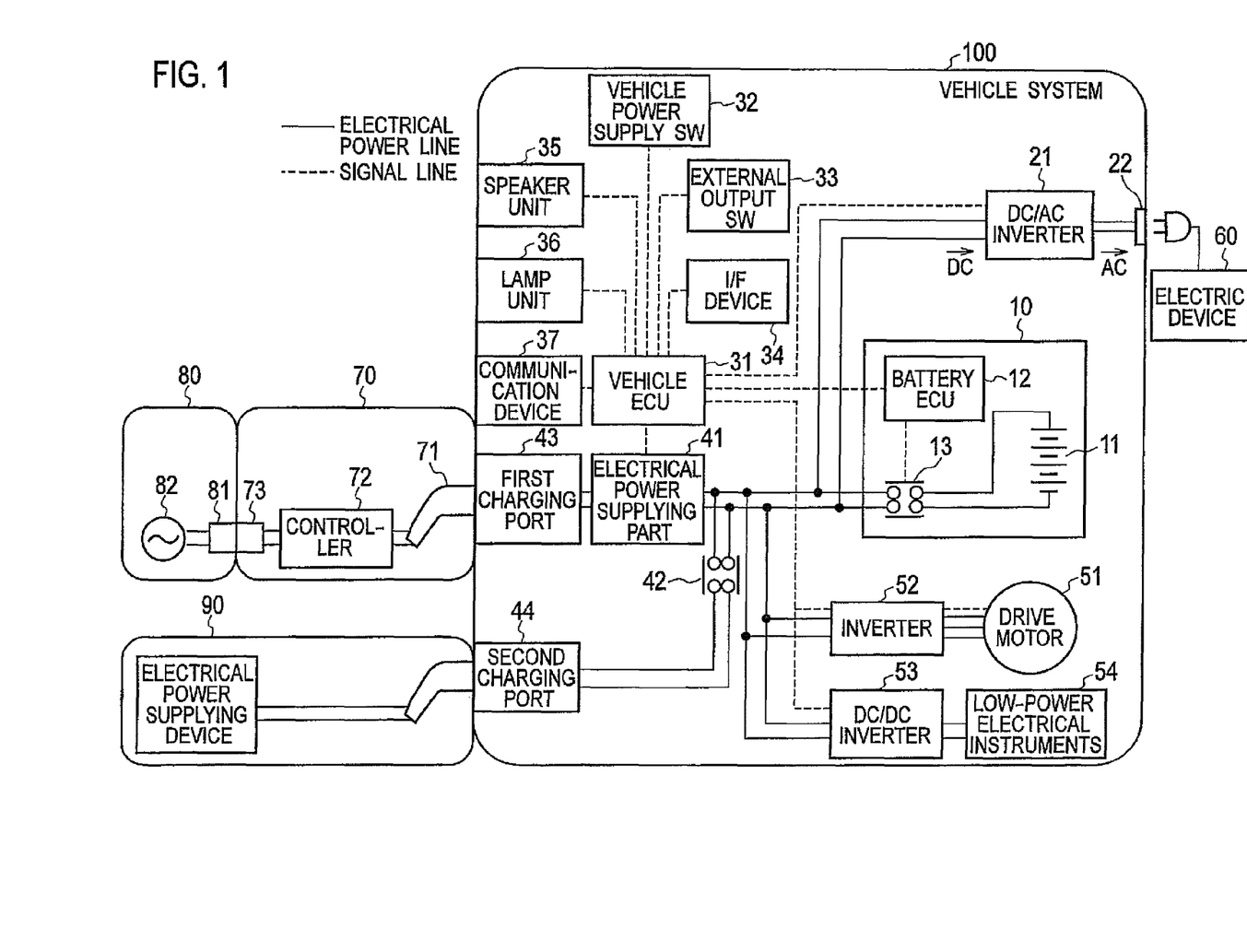
FIG. 1 is a block diagram illustrating configurations of a vehicle system including a vehicle power supply device in embodiments of the present invention and peripheral devices of the vehicle system.

As illustrated in FIG. 1, the vehicle system 100 includes a first charging port 43 to which electrical power supplied from a charging cable 70 is inputted, a battery pack 10 which is charged to store the electrical power supplied via the first charging port 43 and which is discharged to supply the stored electrical power as necessary, and an electrical power supplying part 41 which converts and steps up the electrical power supplied from the first charging port 43 and supplies the electrical power to the battery pack 10.

The battery pack 10 includes a battery 11 which is an example of electricity storage means configured to be charged and discharged to store and supply high-voltage DC electrical power, a battery ECU 12 configured to control the charging and discharging of the battery 11, and a relay 13 configured to be switched such that a connection line of the battery 11 is connected and disconnected. The battery ECU 12 monitors the charging state of the battery 11 and controls the charging and discharging of the battery 11 by switching the relay 13 for the connection and disconnection. The battery ECU 12 sends a signal indicating the charging state of the battery 11 to a vehicle ECU 31 to be described later.

The vehicle system 100 includes a DC/AC inverter 21 which converts the DC electrical power outputted from the battery pack 10 to AC electrical power of a desired voltage (for example, 50 Hz, AC 100V) and a plug socket 22 (external output terminal) which is an example of connection means for supplying the AC electrical power outputted from the DC/AC inverter 21 to an external electric device 60. The vehicle system 100 includes a drive motor 51 used for the traveling of the vehicle, an inverter 52 configured to convert the DC electrical power outputted from the battery pack 10 to AC electrical power and supply the AC electrical power to the drive motor 51, a DC/DC converter 53 configured to convert the voltage of the DC electrical power outputted from the battery pack 10, and low-power electrical instruments 54 configured to operate by electrical power outputted from the DC/DC converter 53. The low-power electrical instruments 54 are, for example, a 12 V battery, headlamps, wipers, various meters, a navigation system, a vehicle interior lighting device, various controllers, and the like.

The vehicle system 100 includes the vehicle ECU 31. A lamp unit 36, a speaker unit 35, a vehicle power supply switch 32, an external output switch 33, an I/F device 34, and a communication device 37 configured to perform various communications with an external device are connected to the vehicle ECU 31. The electrical power supplying part 41, the DC/AC inverter 21, the battery ECU 12, the inverter 52, and the DC/DC converter 53 are connected to the vehicle ECU 31.

The vehicle ECU 31 has a function of controlling the entire vehicle system 100 as a whole. Particularly when the vehicle power supply switch 32 is pressed, the vehicle ECU 31 performs control of appropriately changing modes (four modes to be described later) of the vehicle in response to this pressing operation. When the external output switch 33 is pressed, the vehicle ECU 31 switches activation/stop of the DC/AC inverter 21 and switches the output of the plug socket 22 in response to this pressing operation. Moreover, as will be described later, when the vehicle transitions from a ready mode to an OFF mode, the vehicle ECU 31 performs control of automatically setting the external output switch 33 to an off state. In other words, the vehicle ECU 31 has a function of a switch control unit (switch control means) configured to control the external output switch 33.

When the external output from the plug socket 22 is automatically stopped, i.e. when the electrical power supply to the outside is automatically stopped due to conditions to be described later, the communication device 37 communicates with the external device and notifies the stop of external output. When the external output is automatically stopped, the lamp unit 36 lights a lamp installed at an appropriate portion in the vehicle to notify the output stop to an occupant. When the external output is automatically stopped, the speaker unit 35 emits a warning sound from a speaker installed at an appropriate portion in the vehicle to notify the output stop to the occupant.

The vehicle power supply switch 32 is a push-type switch for switching activation/shut-down of the vehicle system 100. As will be described later, switching to an off mode and to multiple on modes can be performed by operating the vehicle power supply switch 32.

Figure 3A:
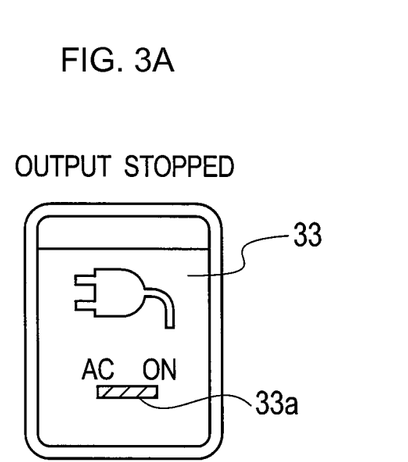
FIGS. 3A and 3B are explanatory diagrams illustrating a turned-on state and a turned-off state of an external output switch of the vehicle power supply device in the embodiments of the present invention.
Figure 3B:
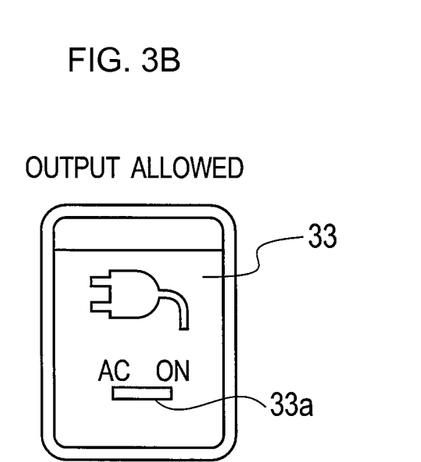

The external output switch 33 (an example of the switching means) is a push-type switch, and whether electrical power is outputted from the plug socket 22 or not can be changed by operating the external output switch 33. Specifically, as shown in FIG. 3A, a lamp 33a is turned off when the external output switch 33 is in the off state. When the external output switch 33 is pressed, the external output switch 33 is switched to the on state and the lamp 33a is turned on as shown in FIG. 3B. Then, when the external output switch 33 is pressed, the external output switch 33 is switched to the off state and the lamp 33a is turned off. Accordingly, the operator can determine whether the electrical power is supplied to the plug socket 22, i.e. whether the electric device 60 can be driven by being connected to the plug socket 22, by viewing the lighting state of the lamp 33a.

When the external output switch 33 is in the on state, AC electrical power is outputted from the DC/AC inverter 21. Meanwhile, when the external output switch 33 is in the off state, no AC electrical power is outputted from the DC/AC inverter 21.

The vehicle power supply switch 32 and the external output switch 33 are independent switches. The external output switch 33 can be arbitrarily switched to the on state or the off state, regardless of the various modes of the vehicle changed by the operation of the vehicle power supply switch 32. Moreover, as will be described later, when the operation mode of the vehicle is switched from the ready mode to the OFF mode, the external output switch 33 automatically transitions from the on state to the off state along with this switching operation. Here, "transitions" refers to switching of the external output switch 33 from the on state to the off state immediately after the switching from the ready mode to the OFF mode or after elapse of a predetermined time from the switching from the ready mode to the OFF mode.

The OF device 34 is an interface for setting display modes of various display units and, for example, can change display modes of charging and discharging symbols to suit the needs of the user.

The vehicle system 100 includes a second charging port 44 configured to be connected to an electrical power supplying device 90 for rapid charging and a relay 42 configured to switch connection/disconnection of the second charging port 44 and the battery pack 10. In the case where there is not much time for charging, the battery 11 can be charged by storing the electrical power supplied from the second charging port 44 with the relay 42 being in the on state.

The charging cable 70 includes a power supply plug 73 configured to be connected to an external power supply 80, a control box 72, and a charging plug 71 configured to be connected to the first charging port 43. The external power supply 80 includes a commercial power supply 82 (for example, AC 100 V, 50 Hz) and a power supply socket 81. By connecting the power supply plug 73 to the power supply socket 81 and connecting the charging plug 71 to the first charging port 43, AC electrical power outputted from the commercial power supply 82 can be supplied to the first charging port 43.

Note that vehicle ECU 31 and the battery ECU 12 which are described above may be formed as, for example, an integrated computer including a central processing unit (CPU), a RAM, a ROM, and storage means such as a hard disk drive.

Next, description is given of the various modes set in the vehicle system 100 and mode changes. The vehicle system 100 in the embodiment is provided with the four modes of the OFF mode, the ACC mode, the ON mode, and the ready mode. Transition to each of the various modes can be performed by operating the vehicle power supply switch 32 and a brake. In this configuration, the OFF mode is an "off mode" in which the vehicle system 100 is shut down, while the ACC mode and the ON mode are modes in which the electrical parts mounted in the vehicle can operate but the vehicle cannot be driven, i.e. a "no-drive-force-generating on mode." Moreover, the ready mode is a mode in which the electrical parts mounted in the vehicle and an EV system can operate and the vehicle can be driven, i.e. a "drive-force-generating on mode."

Note that the ACC mode is a mode in which particular electrical parts such as a radio and an air conditioner among the electrical parts mounted in the vehicle can operate. Meanwhile, the ON mode is a mode in which the electrical parts mounted in the vehicle and the EV system can operate.

Figure 2:
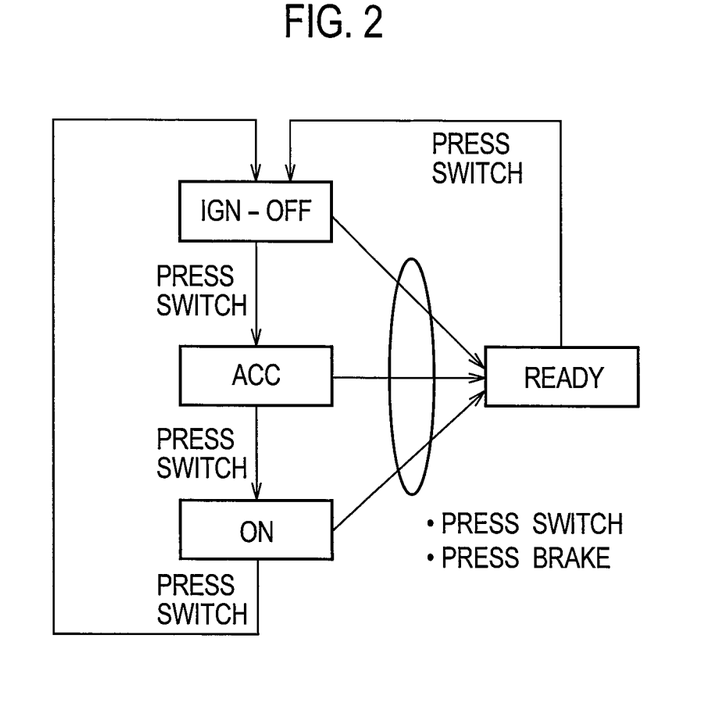
FIG. 2 is an explanatory diagram illustrating mode changes of the vehicle power supply device in the embodiments of the present invention.

FIG. 2 is an explanatory diagram illustrating an operation of the vehicle power supply switch 32 and mode change of the vehicle system 100. As shown in FIG. 2, the mode of the vehicle is changed every time the vehicle power supply switch 32 is pressed. Specifically, the mode of the vehicle is changed to the ACC mode when the vehicle power supply switch 32 is pressed in the OFF mode, is changed to the ON mode when the vehicle power supply switch 32 is pressed in the ACC mode, and returns to the OFF mode when the vehicle power supply switch 32 is pressed in the ON mode. In other words, the mode of the vehicle is changed among the three modes in a successive order every time the vehicle power supply switch 32 is pressed. Meanwhile, when the vehicle power supply switch 32 is pressed with the brake being pressed in any of the aforementioned three modes, the mode of the vehicle is changed to the ready mode.

Accordingly, the driver can sequentially switch the vehicle to OFF, to ACC, to ON, to OFF, and so on every time he/she presses the vehicle power supply switch 32, and can further transition the vehicle to the ready mode by pressing the vehicle power supply switch 32 while pressing the brake.

Meanwhile, when the driver finishes driving the vehicle and stops the vehicle, the driver can transition the vehicle to the OFF mode by pressing the vehicle power supply switch 32. Specifically, when the driver presses the vehicle power supply switch 32 in the ready mode, the vehicle transitions to the OFF mode.

Next, operations of the vehicle power supply device in the aforementioned embodiment are described. In the case of charging the battery 11 mounted in the battery pack 10, an operator plugs the charging plug of the charging cable 70 into the first charging port 43 of the vehicle system 100, and plugs the power supply plug 73 into the power supply socket 81 of the external power supply 80. Then, the electrical power outputted from the commercial power supply 82 is supplied to the first charging port 43 via the charging cable 70 and is further supplied to the electrical power supplying part 41.

Moreover, the battery ECU 12 provided in the battery pack 10 monitors the charging state of the battery 11 and, when the battery 11 is in a chargeable state, outputs this information to the vehicle ECU 31. Furthermore, the battery ECU 12 sets the relay 13 to the ON state. The vehicle ECU 31 outputs an instruction signal for executing the charging of the battery 11 to the electrical power supplying part 41. When receiving this instruction signal, the electrical power supplying part 41 steps up the AC electrical power supplied from the first charging port 43 to a desired voltage, converts the AC electrical power to DC electrical power, and outputs the DC electrical power to the battery 11. The battery 11 can be thereby charged. After the charging of the battery 11 is completed, the charging plug 71 is removed.

In the case of rapid charging, charging can be performed in a short time by connecting the electrical power supplying device 90 for rapid charging to the second charging port 44.

Then, when the vehicle is made to travel by driving the drive motor 51, the vehicle ECU 31 performs control such that the electrical power stored in the battery 11 is supplied to the inverter 52 and the inverter 52 operates. Three-phase AC electrical power is thereby generated and supplied to the drive motor 51 (three-phase AC motor) to drive the drive motor 51.

Moreover, the low-power electrical instruments 54 including headlamps and wipers can be driven by causing the DC/DC converter 53 to operate.

Figure 4:
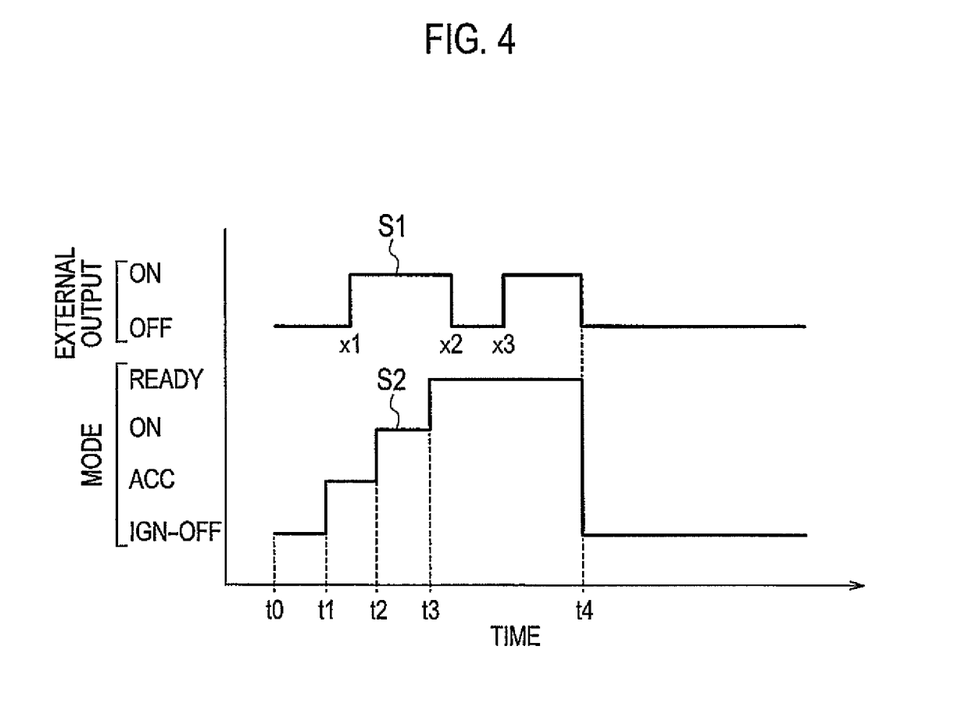
FIG. 4 is a timing chart depicting mode changes and changes of an external output switch in the vehicle power supply device in a first embodiment of the present invention.

Next, description is given of operations related to control of performing and stopping the supply of the electrical power to the plug socket 22 in the vehicle system 100 in the embodiment, with reference to the timing chart depicted in FIG. 4. In FIG. 4, the curved line Si indicates the ON/OFF state of the external output switch 33, and the curved line S2 indicates the mode of the vehicle.

As described above, since the vehicle power supply switch 32 and the external output switch 33 can be independently switched, the switching operation of the external output switch 33 can be performed regardless of the current mode of the vehicle (one of the four modes described above). When the operator sets the external output switch 33 to the on state, the operation signal of the external output switch 33 is outputted to the vehicle ECU 31 and the vehicle ECU 31 performs of control of outputting a drive instruction and an on instruction of the DC/AC inverter 21. As a result, the electrical power stored in the battery 11 is supplied to the DC/AC inverter 21, and the DC/AC inverter 21 operates to convert the DC electrical power to AC electrical power (for example, 50 Hz, AC 100V). The AC electrical power is then supplied to the plug socket 22.

The electric device 60 can be thus made to operate by plugging a power plug of the electric device 60 into the plug socket 22. For example, a mobile phone can be charged in the vehicle by plugging a power plug of a charger of the mobile phone into the plug socket 22.

Meanwhile, the supply of electrical power to the plug socket 22 can be stopped by setting the external output switch 33 to the off state. Specifically, when the external output switch 33 is turned off, an instruction signal of the external output switch 33 is outputted to the vehicle ECU 31, and the vehicle ECU 31 performs control such that the supply of electrical power to the DC/AC inverter 21 is stopped and the operation of the DC/AC inverter 21 is stopped. The supply of electrical power to the plug socket 22 is thus stopped. For example, as depicted by the curved line S1, when the external output switch 33 is pressed at the time point x1, the external output is turned on. When the external output switch 33 is pressed again at the time point x2, the external output is turned off. Furthermore, when the external output switch 33 is pressed again at the time point x3, the external output is turned on. As described above, the on/off of the electrical power output to the outside is switched every time the external output switch 33 is pressed.

Moreover, when the vehicle is in the OFF mode at the time point t0 of FIG. 4 and the vehicle power supply switch 32 is pressed at the time point t1 in this state, the vehicle transitions to the ACC mode. Furthermore, when the vehicle power supply switch 32 is pressed again at the time point t2, the vehicle transitions to the ON mode. When the vehicle power supply switch 32 is pressed at the time point t3 with the brake pressed, the vehicle transitions to the ready mode and can be driven in the ready mode.

Thereafter, when the driver stops the vehicle and presses the vehicle power supply switch 32 at the time point t4, the vehicle transitions from the ready mode to the OFF mode. Furthermore, at the time point t4, the vehicle ECU 31 illustrated in FIG. 1 performs control of turning off the external output switch 33. Specifically, when the vehicle transitions from the ready mode to the OFF mode, the vehicle ECU 31 performs control of turning off the external output switch 33 along with this transition.

Furthermore, in order to notify the forced turning-off of the external output switch 33 to the driver, the lamp unit 36 is turned on, a warning sound is emitted from the speaker unit 35, and a signal indicating the forced turning-off is sent to the external device by the communication device 37. Thereafter, the lamp unit 36, the speaker unit 35, and the communication device 37 are turned off.

As described above, the vehicle power supply device can avoid a case where the external output switch 33 is continuously in the on state when the driver stops the vehicle and gets off the vehicle, and prevent the electrical power stored in the battery 11 from being consumed while the vehicle is stopped. Note that, when the external output switch 33 is in the off state at the time point t4 illustrated in FIG. 4, the off state is maintained as it is.

As described above, in the vehicle power supply device in the embodiment, when the mode of the vehicle is switched from the ready mode to the OFF mode while the external output switch 33 is in the on state, the external output switch 33 is turned off along with this mode switching operation and the supply of electrical power to the plug socket 22 is stopped. Accordingly, even if the driver forgets the operation of switching the external output switch 33 to the off state when stopping the vehicle and getting off the vehicle, the external output switch 33 is turned off along with the transition operation to the OFF mode which is an operation performed at the time of stopping the vehicle. Accordingly, the external output can be surely stopped when the driver gets off the vehicle.

Hence, the vehicle power supply device can prevent the external output switch 33 from being continuously in the on state and prevent unnecessary consumption of battery power while the vehicle is stopped, thereby preventing exhaustion of the battery.

Moreover, in the embodiment, only when the vehicle transitions from the ready mode to the OFF mode, the external output switch 33 is turned off along with the transition. For example, when the vehicle transitions from the ON mode to the OFF mode (see FIG. 2), the state of the external output switch 33 is not changed. Accordingly, the electrical power supply can be prevented from being unduly stopped when the electric device 60 is connected to the plug socket 22 and is operating in the vehicle while the vehicle is stopped.

For example, assume a case where the vehicle transitions from the ACC mode or the ON mode to the OFF mode while the external output switch 33 is in the on state. In this case, the electric device 60 is operating in a parked state after the vehicle is stopped, and it is conceivable that the operator is causing the electrical power to be outputted from the plug socket 22 and making the electric device 60 operate for some reason such as the operator is using the electric device 60 outside the vehicle. Accordingly, the operator has a strong recognition that the external output switch 33 is in the on state. Thus, the possibility of the operator forgetting to perform the operation of turning off the external output switch 33 when getting off the vehicle is low. In such a case, usability can be improved by continuing the external output when the operation of switching to the OFF mode is performed, instead of forcedly stopping the external output along with the switching operation. In view of this, in the embodiment, when the vehicle transitions from the drive-force-generatable on mode (ready mode) to the OFF mode, the external output is stopped along with this transition. This can prevent the electrical power stored in the battery from being consumed after the driver gets off the vehicle. Meanwhile, when the vehicle transitions from the ACC mode or the ON mode to the OFF mode, the external output is not stopped. Specifically, when the vehicle transitions from the no-drive-force-generating on mode (for example, ON mode or ACC mode) to the off mode (OFF mode), the on state of the external output switch 33 is maintained.

[Description of Second Embodiment]

Figure 5A:
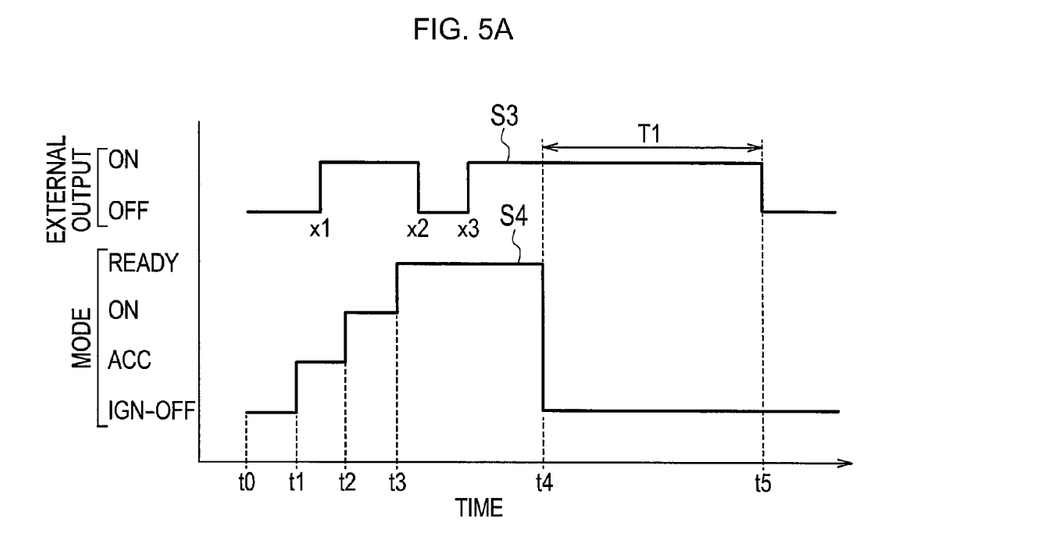
FIGS. 5A and 5B are timing charts depicting mode changes and changes of the external output switch in the vehicle power supply device in a second embodiment of the present invention.
Figure 5B:
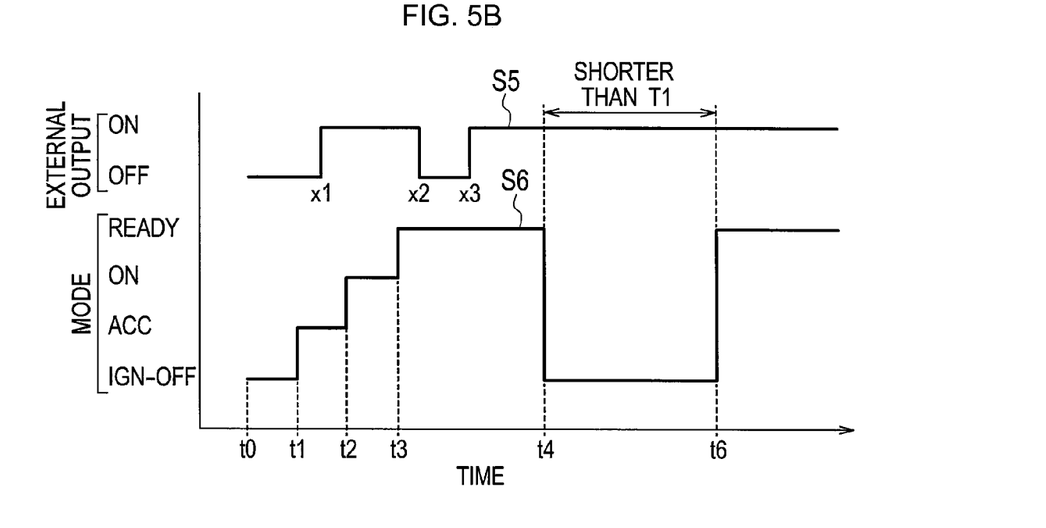

Next, a second embodiment of the present invention is described. Since the configurations of devices are the same as those in the aforementioned first embodiment, description thereof is omitted. In the second embodiment, the timing at which the external output is stopped when the vehicle transitions from the ready mode to the OFF mode is different from that described in the aforementioned first embodiment. Specifically, in the first embodiment, when the vehicle transitions from the ready mode to the OFF mode, the vehicle ECU 31 turns off the external output switch 33 at the same timing as the transition (time point t4 of FIG. 4). In the second embodiment, the vehicle ECU 31 turns off the external output switch 33 after a predetermined time elapses from the time point t4 of FIG. 4. Operations of a vehicle power supply device in the second embodiment are described below with reference to the timing charts depicted in parts (a) and (b) of FIG. 5.

The curves S3 and S5 in parts (a) and (b) of FIG. 5 indicate the on/off state of the external output switch 33, and the curves S4 and S6 indicate the transition of the mode of the vehicle. Moreover, FIG. 5A depicts the case where the vehicle does not transition to the ready mode again even when a predetermined time T1 elapses from the time point t4, and FIG. 5B depicts the case where the vehicle transitions to the ready mode again before the predetermined time t1 elapses from the time point t4.

First, description is given of FIG. 5A. FIG. 5A is the same as the timing chart depicted in FIG. 4 up to the time point t4. When the vehicle transitions from the ready mode to the OFF mode at the time point t4, a timer (not illustrated) included in the vehicle ECU 31 operates to measure the time elapsed from the time point t4. Then, at a time point t5 when time T1 (predetermined time) elapses from the time point t4, the vehicle ECU 31 turns off the external output switch 33 (see curved line S3). Accordingly, even when the vehicle transitions from the ready mode to the OFF mode, the electrical power is supplied from the plug socket 22 for the time T1, and the external electric device 60 can thus operate.

Next, FIG. 5B is described. FIG. 5B is the same as the timing chart depicted in FIG. 4 up to the time point t4. When the vehicle transitions from the ready mode to the OFF mode at the time point t4, the timer (not illustrated) included in the vehicle ECU 31 operates to measure the time elapsed from the time point t4. Then, when the vehicle transitions to the ready mode again at a time point t6 before the time T1 (predetermined time) elapses, the vehicle ECU 31 clears the time measured by the timer and the external output switch 33 is continuously in the on state (see curved line S5). Specifically, when the vehicle is stopped and in the OFF mode only for a time shorter than the predetermined time T1, the external output switch 33 is continuously in the on state without being switched to the off state.

As described above, in the vehicle power supply device in the second embodiment, the external output switch 33 is not immediately turned off when the vehicle transitions from the ready mode to the OFF mode but is turned off after the time T1 elapses. This is thus effective in the case where the vehicle is temporarily stopped and driven again after elapse of a short time as in, for example, a delivery vehicle including refrigerating installation. Specifically, it is possible to avoid a cumbersome operation in which the electric device 60 connected to the plug socket 22 and used for the operation of the refrigerating installation is switched on and off every time the vehicle is stopped and driven.

Moreover, the operator can arbitrarily change the setting time (T1 in FIG. 5) of the timer in the vehicle ECU 31. This enables flexible setting of the predetermined time which suites the driving conditions of the driver.

[Description of Third Embodiment]

Next, a third embodiment of the present invention is described. Since the configurations of devices are the same as those in the aforementioned first embodiment, description thereof is omitted. In the third embodiment, when the external output switch 33 automatically transitions to the off state due to the transition of the vehicle from the ready mode to the OFF mode and thereafter the vehicle transitions to the ready mode again, the vehicle ECU 31 automatically turns on the external output switch 33.

Figure 6:
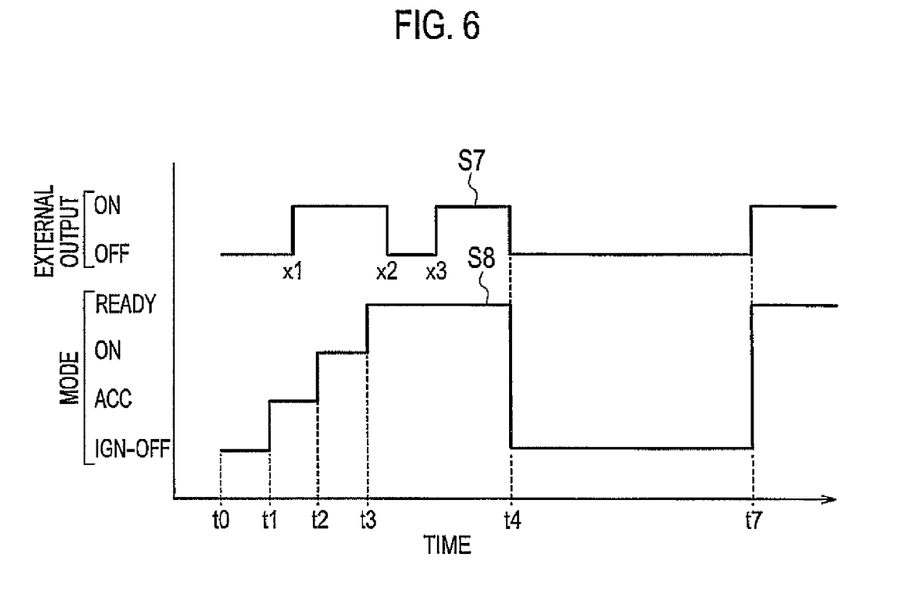
FIG. 6 is a timing chart depicting mode changes and changes of the external output switch in the vehicle power supply device in a third embodiment of the present invention.

Operations of the vehicle power supply device in the third embodiment are described below with reference to the timing chart depicted in FIG. 6. The curved line S7 of FIG. 6 indicates the on/off state of the external output switch 33, and the curved line S8 indicates the transition of the mode of the vehicle. FIG. 6 is the same as the timing chart depicted in FIG. 4 up to the time point t4. In the third embodiment, the vehicle is switched from the ready mode to the OFF mode at the time point t4 and the vehicle ECU 31 turns off the external output switch 33 along with this transition. Thereafter, when the vehicle transitions to the ready mode again at a time point t7, the vehicle ECU 31 automatically switches the external output switch 33 to the on state even when there is no operation of the external output switch 33.

In the third embodiment, first, the driver stops the vehicle, causes the vehicle to transition from the ready mode to the OFF mode, and gets off the vehicle. Thereafter, the driver gets on the vehicle again and causes the vehicle to transition from the OFF mode to the ready mode to cause the vehicle to be driven. At this time, the vehicle ECU 31 automatically switches the external output switch 33 to the on state. Accordingly, it is possible to start the supply of electrical power from the plug socket 22 with the operation of pressing the external output switch 33 omitted.

Specifically, the driver getting off the vehicle with the external output switch 33 being in the on state is likely to have a desire that the external output switch 33 is turned on again when he/she thereafter gets on the vehicle again. In the vehicle power supply device in the third embodiment, it is possible to omit the operation of turning on again the external output switch 33 which has been automatically turned off, and to thereby improve the convenience.

Although the contents of the present invention are described above by using the embodiments of the present invention, the present invention is not limited by the description of the embodiments. It is obvious to those skilled in the art that various modifications and improvements can be made.

The invention claimed is:

1. A vehicle power supply device to be mounted in a vehicle capable of traveling by using a motor as a drive source, the vehicle power supply device comprising:
    a vehicle power supply switch for operating the vehicle in any one of an off mode, a no-drive-force-generating on mode, and a drive-force-generatable on mode;
    a battery;
    an external output terminal to supply an external device with electrical power outputted from the battery;
    an external output switch configured to be switched between an on state, in which the electrical power is supplied from the battery to the external output terminal, and an off state, in which the supply of the electrical power to the external output terminal is stopped, and configured to be switched independently from the vehicle power supply switch; and
    a switch control unit configured to control the external output switch, wherein
    in a case where the external output switch is in the on state,
        when the vehicle transitions from the drive-force-generatable on mode to the off mode, the switch control unit sets the external output switch to the off state along with the transition, and
        when the vehicle transitions from the no-drive-force-generating on mode to the off mode, the switch control unit maintains the on state of the external output switch.

2. The vehicle power supply device according to claim 1, wherein the switch control unit switches the external output switch from the on state to the off state after a predetermined time set in advance elapses from the transition from the drive-force-generatable on mode to the off mode.

3. The vehicle power supply device according to claim 2, wherein the predetermined time is arbitrarily changeable in the switch control unit.

4. The vehicle power supply device according to claim 1, wherein when the external output switch is in the off state due to the transition from the drive--force-generatable on mode to the off mode and thereafter the vehicle transitions from the off mode to the drive-force-generatable on mode, the switch control unit switches the external output switch from the off state to the on state.

5. The vehicle power supply device according to claim 1, wherein the switch control unit sets the external output switch to the off state only when the vehicle transitions from the drive-force-generatable on mode to the off mode.

6. A vehicle power supply device to be mounted in a vehicle capable of traveling by using a motor as a drive source, the vehicle power supply device comprising:
    a vehicle power supply switching means for operating the vehicle in any one of an off mode, a no-drive-force-generating on mode, and a drive-force-generatable on mode;
    electricity storage means;
    connection means for supplying an external device with electrical power outputted from the electricity storage means;
    switching means for being switched between an on state, in which the electrical power is supplied from the electricity storage means to the connection means, and an off state, in which the supply of electrical power to the connection means is stopped, and configured to be switched independently from the vehicle power supply switching means; and
    a switch control means for controlling the switching means, wherein
    in a case where the switching means is in the on state
        when the vehicle transitions from the drive-force-generatable on mode to the off mode, the switch control means sets the switching means to the off state along with the transition, and when the vehicle transitions from the no-drive-force-generating on mode to the off mode, the switch control means maintains the on state of the switching means.

\* \* \* \* \*